(12) United States Patent
Martis et al.

(10) Patent No.: US 7,762,084 B2
(45) Date of Patent: Jul. 27, 2010

(54) SYSTEM AND METHOD FOR CONTROLLING THE WORKING LINE POSITION IN A GAS TURBINE ENGINE COMPRESSOR

(75) Inventors: Dan Martis, Montreal West (CA); Arthur Rowe, Littleover (GB)

(73) Assignee: Rolls-Royce Canada, Ltd., Montreal (CA)

( * ) Notice: Subject to any disclaimer, the term of this patent is extended or adjusted under 35 U.S.C. 154(b) by 1153 days.

(21) Appl. No.: 11/271,413

(22) Filed: Nov. 11, 2005

(65) Prior Publication Data

US 2006/0101826 A1    May 18, 2006

Related U.S. Application Data

(60) Provisional application No. 60/627,399, filed on Nov. 12, 2004.

(51) Int. Cl.
*F02C 3/10* (2006.01)
*F02C 6/00* (2006.01)

(52) U.S. Cl. .................. 60/792; 60/785; 60/39.091

(58) Field of Classification Search .............. 60/779, 60/782, 785, 39.091, 792, 795; 415/145, 415/160
See application file for complete search history.

(56) References Cited

U.S. PATENT DOCUMENTS

| | | | | |
|---|---|---|---|---|
| 3,403,842 A | * | 10/1968 | Roche | 415/48 |
| 3,971,208 A | * | 7/1976 | Schwent | 60/773 |
| 4,060,979 A | * | 12/1977 | Elsaesser et al. | 60/773 |
| 4,069,661 A | | 1/1978 | Rundell et al. | |
| 4,186,556 A | * | 2/1980 | Lowry et al. | 60/773 |
| 4,252,498 A | * | 2/1981 | Radcliffe et al. | 415/26 |
| 4,550,564 A | * | 11/1985 | Callahan et al. | 60/39.093 |
| 4,622,808 A | * | 11/1986 | Kenison et al. | 60/795 |
| 4,655,034 A | * | 4/1987 | Kenison et al. | 60/795 |
| 5,150,567 A | | 9/1992 | Farrell | |
| 5,174,105 A | * | 12/1992 | Hines | 60/774 |
| 5,224,337 A | * | 7/1993 | Morishita et al. | 60/773 |
| 5,281,087 A | * | 1/1994 | Hines | 415/160 |
| 5,419,112 A | | 5/1995 | Farrell | |
| 5,768,884 A | | 6/1998 | Hines | |
| 5,775,092 A | | 7/1998 | Hines | |
| 5,782,603 A | * | 7/1998 | O'Brien et al. | 415/1 |
| 5,832,714 A | | 11/1998 | Hines | |
| 5,911,679 A | | 6/1999 | Farrell et al. | |
| 6,164,902 A | * | 12/2000 | Irwin et al. | 415/17 |
| 6,457,938 B1 | | 10/2002 | Liu et al. | |
| 6,513,333 B2 | * | 2/2003 | Sugitani | 60/773 |
| 6,551,057 B1 | * | 4/2003 | Haaser et al. | 415/119 |
| 6,701,717 B2 | * | 3/2004 | Flatman et al. | 60/792 |
| 6,820,429 B2 | * | 11/2004 | Meisner | 60/773 |
| 2001/0000090 A1 | | 4/2001 | Thompson | |
| 2001/0045088 A1 | * | 11/2001 | Sugitani | 60/39.02 |
| 2002/0150471 A1 | | 10/2002 | Liu et al. | |
| 2002/0157378 A1 | | 10/2002 | Vogeler | |
| 2003/0079465 A1 | | 5/2003 | Beutin et al. | |
| 2003/0126864 A1 | | 7/2003 | Thompson | |
| 2003/0131605 A1 | | 7/2003 | Meisner | |

(Continued)

*Primary Examiner*—William H Rodríguez
(74) *Attorney, Agent, or Firm*—Krieg DeVault LLP

(57) ABSTRACT

A system for actively controlling the working line location within a low pressure compressor. The system includes a plurality of variable inlet guide vanes that are adjusted to maintain the working line at a constant level as the low pressure compressor rotates at a constant speed.

15 Claims, 6 Drawing Sheets

U.S. PATENT DOCUMENTS

2003/0167750 A1   9/2003   Bornhoft et al.
2003/0192316 A1   10/2003  Rowe et al.
2004/0040279 A1   3/2004   Groppi et al.

* cited by examiner

SYSTEM AND METHOD FOR CONTROLLING THE WORKING LINE POSITION IN A GAS TURBINE ENGINE COMPRESSOR

CROSS-REFERENCE TO RELATED APPLICATIONS

The present application claims the benefit of U.S. Provisional Application Ser. No. 60/627,399 filed on Nov. 12, 2004, which is incorporated herein by reference.

BACKGROUND OF THE INVENTION

The present invention relates generally to a system for controlling the operation of a gas turbine engine. More specifically, the present invention relates to the closed loop control of the working line (W/L) level of a compressor running at a constant speed through modulation of the variable inlet guide vanes (VIGV).

Designers of axial flow compressors for gas turbine engines must consider many issues associated with fluid flow including stall and/or surge. A stall generally refers to a breakdown in fluid flow in only some of the stages in a multi-stage compressor and a surge generally refers to a complete breakdown of smooth fluid flow through the compressor and generally includes the reversal of flow.

The air flow and pressure ratio of the compressor at which a surge occurs is labeled a surge point. A surge point is a characteristic of each compressor speed, and a line which joins a group of surge points drawn on a graph of pressure ratio vs. mass flow, is called the surge line. The surge line represents the minimum stable air flow which can be obtained at any rotational speed. Compressors are generally designed to have a surge safety margin between the air flow and pressure ratios at which they will normally be operated and the air flow and pressure ratios at which a surge will occur.

Many prior gas turbine engines have utilized control systems in attempts to maintain a desired surge safety margin. With reference to FIG. 1, there is illustrated a generic characteristic of a prior system including a low-pressure compressor running at a constant speed. The graph set forth in FIG. 1, includes a plurality of constant speed lines 10. More specifically, the constant speed lines 10 have substantially the same values but each is represented at a different VIGV angle. The working line 13 runs along speed line 10 between the idle point 14 and the bleed off valves (BOV) closing point 15. The position of the working line 13 between idle point 14 and the BOV closing point 15 is controlled in open loop by the modulation of the BOVs. The state of the BOVs is scheduled against corrected output power and the corrected speed of the engine.

From the BOV closing point 15 to the base load power point 16, the working line 13 position continues to be controlled in open loop through the low pressure VIGVs against corrected output power and the corrected speed of the engine. In order to avoid entering the stall/surge domain, the compressor is provided with a pressure ratio limiter 11, which monitors the working line 13 position in closed loop. Upon the working line 13 position exceeding the pressure ratio limiter 11, the control system modulates the BOVs in order to maintain the working line 13 level at the pressure ratio limiter level 11.

The surge margin is depicted in FIG. 1 between the pressure ratio limiter 11 and the surge line 12. The available surge margin is comprised of various threats, including: production scatter associated with engine to engine variation; engine deterioration and fouling; variables mal-scheduling; transient excursions above the steady state working line; and instrument accuracy. These threats erode the surge margin progressively from both sides; up by increasing the working line position level and down by lowering the surge line level. As the engine deteriorates the compressor working line position moves up progressively.

In this prior system as the working line approaches the pressure ratio limiter the BOVs are opened which results in the engine losing power and efficiency. Further, in this prior system the position of the VIGVs is scheduled against power and as the engine power drops the VIGVs angle closes progressively, further effecting engine performance and leading to further engine deterioration.

Many prior systems include techniques for controlling the operating parameters of compressors. However, there remains a substantial need for additional development in controlling the operation of a gas turbine engine compressor. The present invention satisfies this and other needs in a novel and unobvious way.

SUMMARY OF THE INVENTION

One form of the present invention contemplates an apparatus, comprising: an electric generator; a first compressor including a plurality of variable inlet guide vanes; a first turbine coupled to the the first compressor and the electrical generator, the first turbine driving the first compressor and the electrical generator at a substantially constant speed; a second compressor; a second turbine coupled to the second compressor and operable to drive the second compressor; and the first compressor has a working line maintained at a constant level by closed loop control of the plurality of variable inlet guide vanes.

Another form of the present invention contemplates a method comprising: flowing an exhaust gas to a turbine coupled by a drive system to a low-pressure compressor and a power generation device; operating the low pressure compressor and the power generation device at a constant rotational speed; determining a surge line for the low pressure compressor; comparing the surge line with a working line for the low-pressure compressor to define a surge margin; and, actively controlling a plurality of variable inlet guide vanes within the low-pressure compressor to prevent the working line from moving towards the surge line and reducing the surge margin.

In yet another form the present invention contemplates an apparatus, comprising: an electric generator; a low-pressure compressor including a plurality of variable inlet guide vanes and a plurality of bleed off valves; a high-pressure compressor; a high-pressure turbine coupled to the high-pressure compressor and operable to drive the high-pressure compressor; a low-pressure turbine coupled to the low-pressure compressor and the electrical generator, the low-pressure turbine driving the low-pressure compressor and the electrical generator at a constant rotational speed; and, the low-pressure compressor has a working line controlled by operation of the plurality of bleed off valves up to a bleed off valve closing point, at the bleed off valve closing point the plurality of bleed off valves are closed, and control of the working line above the bleed off valve closing point is through operation of the plurality of variable inlet guide vanes to maintain the working line at a constant level independent of engine output power.

In yet another form the present invention contemplates a method comprising: rotating an electric generator at a constant speed; rotating a first compressor with the electric generator at the constant speed; establishing a target pressure ratio for the first compressor based upon the position of a plurality of variable inlet guide vanes within the first compressor and the rotational speed of the first compressor; determining a first pressure ratio for the first compressor, the first pressure ratio is equal to the (static pressure downstream of the first compressor outlet)/(total pressure at the first compressor inlet); comparing the first pressure ratio with the target pressure ratio; and, adjusting the position of the plurality of variable inlet guide vanes to adjust the fluid flow within the first compressor and cause the first pressure ratio to converge on the target pressure ratio.

One object of the present invention is to provide a unique system for controlling the working line position within a low-pressure compressor operating at a constant speed.

Related objects and advantages of the present invention will be apparent from the following description.

DESCRIPTION OF THE PREFERRED EMBODIMENTS

Figure 1:
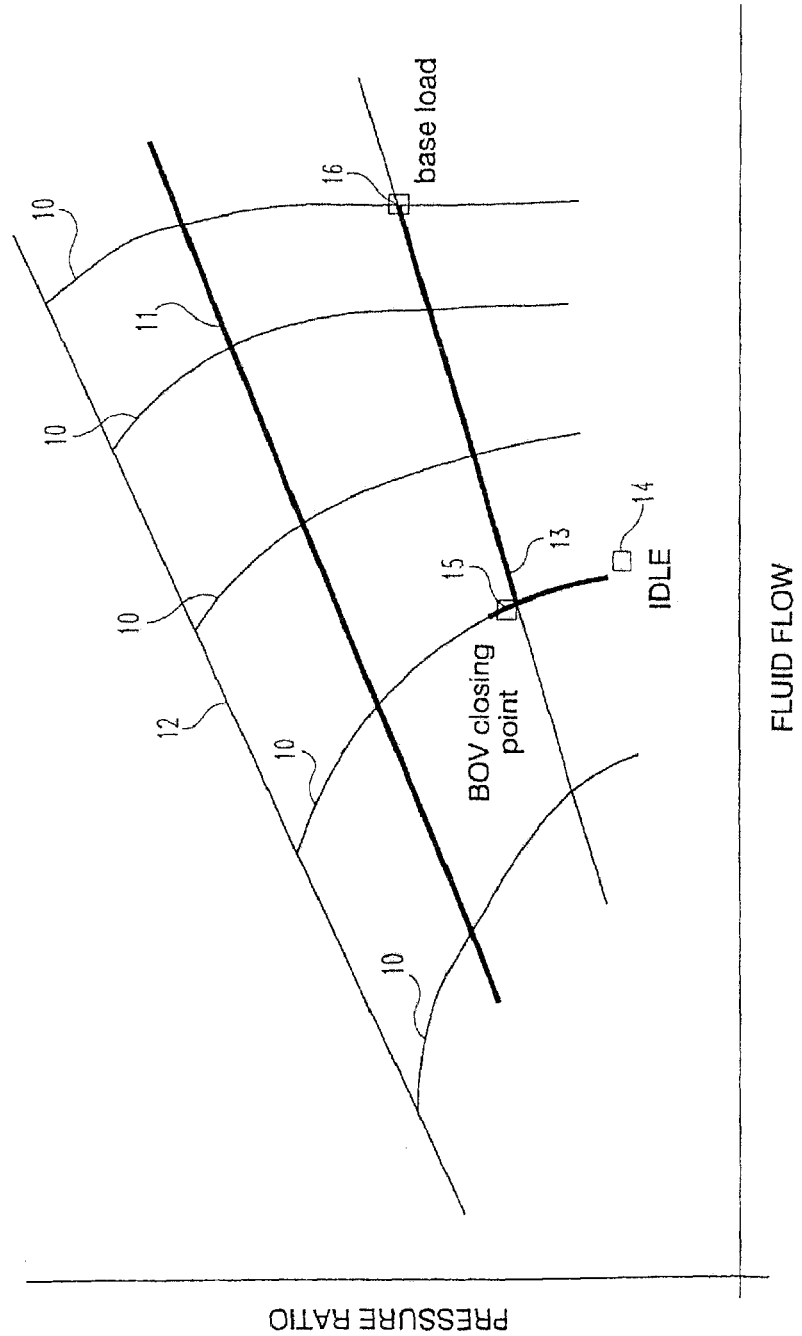
FIG. 1 is a schematic diagram illustrating characteristics of a prior low-pressure compressor running at constant speed.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
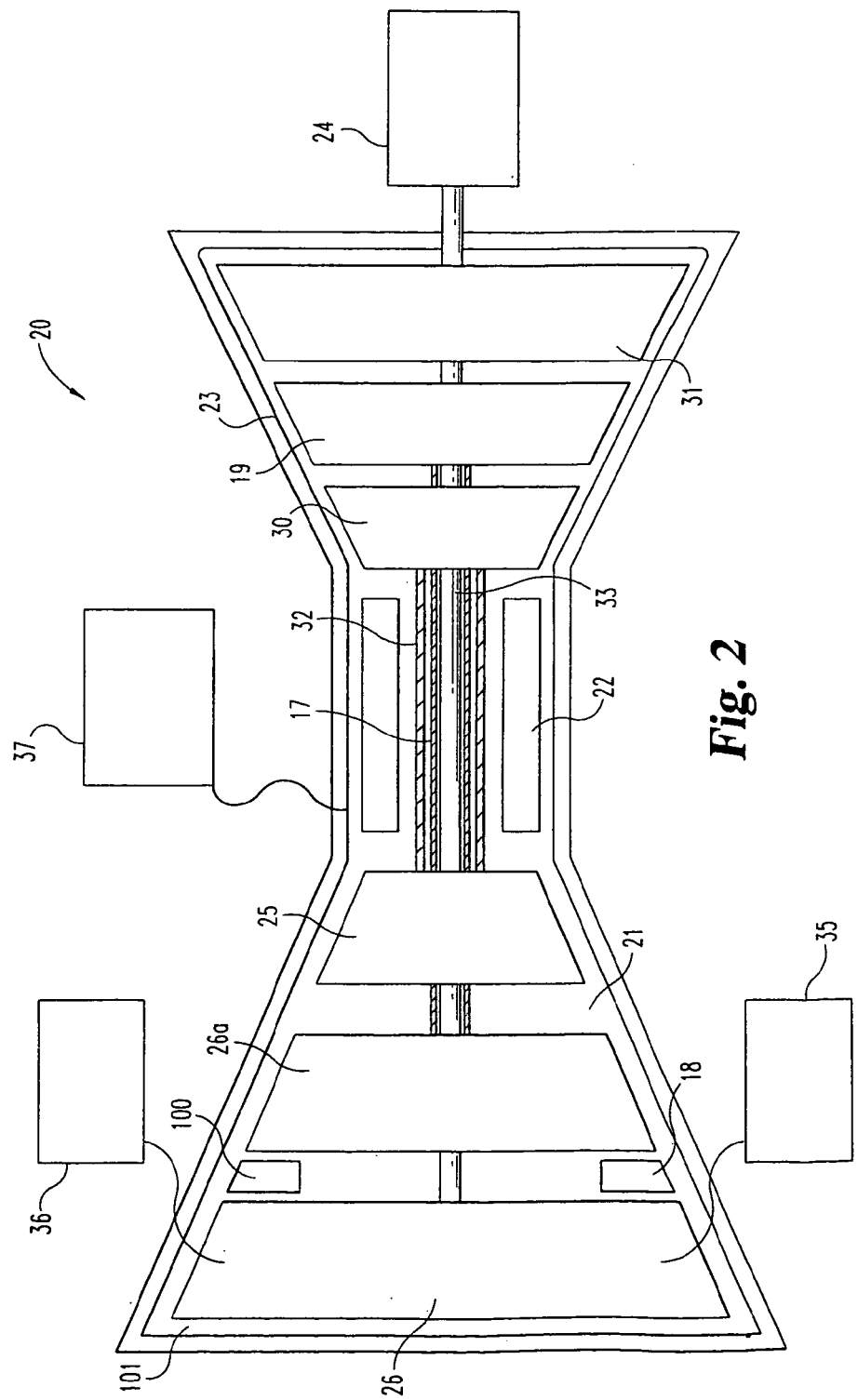
FIG. 2 is a schematic illustration of a gas turbine engine including one embodiment of the present invention.

With reference to FIG. 2, these is illustrated a schematic representation of a multi-spool gas turbine engine 20. The representation is not intended to be limiting and changes in the basic engine configuration, number of stages and additional equipment is contemplated herein. The gas turbine engine 20 will be described generally; however significant details regarding general gas turbine engines will not be presented herein as it is believed that the theory of operation and general parameters of gas turbine engines are well known to those of ordinary skill in the art.

Gas turbine engine 20 includes an axial flow compressor section 21, a combustor section 22 and a turbine section 23. A portion of the power extracted from the turbine section 23 is utilized to drive a power generation device 24, which in a preferred form is an electrical generator. The electrical generator will be run at a substantially constant speed that is appropriate for the desired grid frequency; a non-limiting example being 50 or 60 Hz. In one form of the present invention the compressor section 21 includes a high-pressure compressor 25, intermediate-pressure compressor 26a and a low-pressure compressor 26. Each of the compressors 25, 26a and 26 are axial flow multi-stage compressors.

Fuel and the pressurized air from the compressor section 21 are burned in the combustor 22 to deliver a hot exhaust gas flow to the turbine section 23. The turbine section 23 includes a high-pressure turbine 30, intermediate-pressure turbine 19 and a low-pressure turbine 31. High-pressure turbine 30 receives the exhaust gas flow from the combustor and the work extracted by this turbine is utilized to drive the high-pressure compressor 25 through shaft 32. The exhaust gas flow exiting the high-pressure turbine 30 is further expanded in the intermediate-pressure turbine 19 and thereafter the exhaust gas flow exiting the intermediate-pressure turbine 19 is expanded in the low-pressure turbine 31. The intermediate-pressure turbine 19 is coupled with the intermediate-pressure compressor 26a through shaft 17.

The work extracted from the exhaust gas in the low-pressure turbine 31 is used to power the low-pressure compressor 26 and the power generation device 24. A drive system 33 mechanically couples the low-pressure turbine 31 with the power generation device 24 and the low-pressure compressor 26. More specifically, the low-pressure compressor 26 is connected to and rotates with the power generation device. As the power generation device 24 is required to be run at a constant speed the low-pressure compressor 26 and the low-pressure turbine 31 also run at this same rotational speed. The low-pressure compressor 26, low-pressure turbine 31 and the power generation device 24 are all connected together through shaft 33 and rotate at the same speed.

The low-pressure compressor 26 includes a plurality of bleed off valves (BOV) 35 that are operable to allow the release of working fluid from the flow path. When the plurality of BOVs 35 is opened a quantity of the working fluid is released from the flow path and the efficiency of the engine is decreased. Further, the low-pressure compressor includes a plurality of variable inlet guide vanes (VIGV) 36. The plurality of VIGVs 36 and the plurality of BOVs 35 are operatively coupled to and controllable through an engine controller system 37. The engine controller system may be a single system or a distributed system as required by the system design.

The inlet to the low-pressure compressor 26 includes a sensor 101 for determining the total pressure of the working fluid entering the low pressure compressor 26. In one form a duct 100 within the compressor section 21 connects the fluid flow path from the outlet of the low-pressure compressor 26 to the inlet of the intermediate-pressure compressor 26a. In a preferred form the duct 100 is an annular inter-compressor duct. In one form of the present invention a sensor 18 is located within the duct 100 and is operable to determine the static pressure of the working fluid downstream of the exit of the low-pressure compressor 26.

Figure 3:
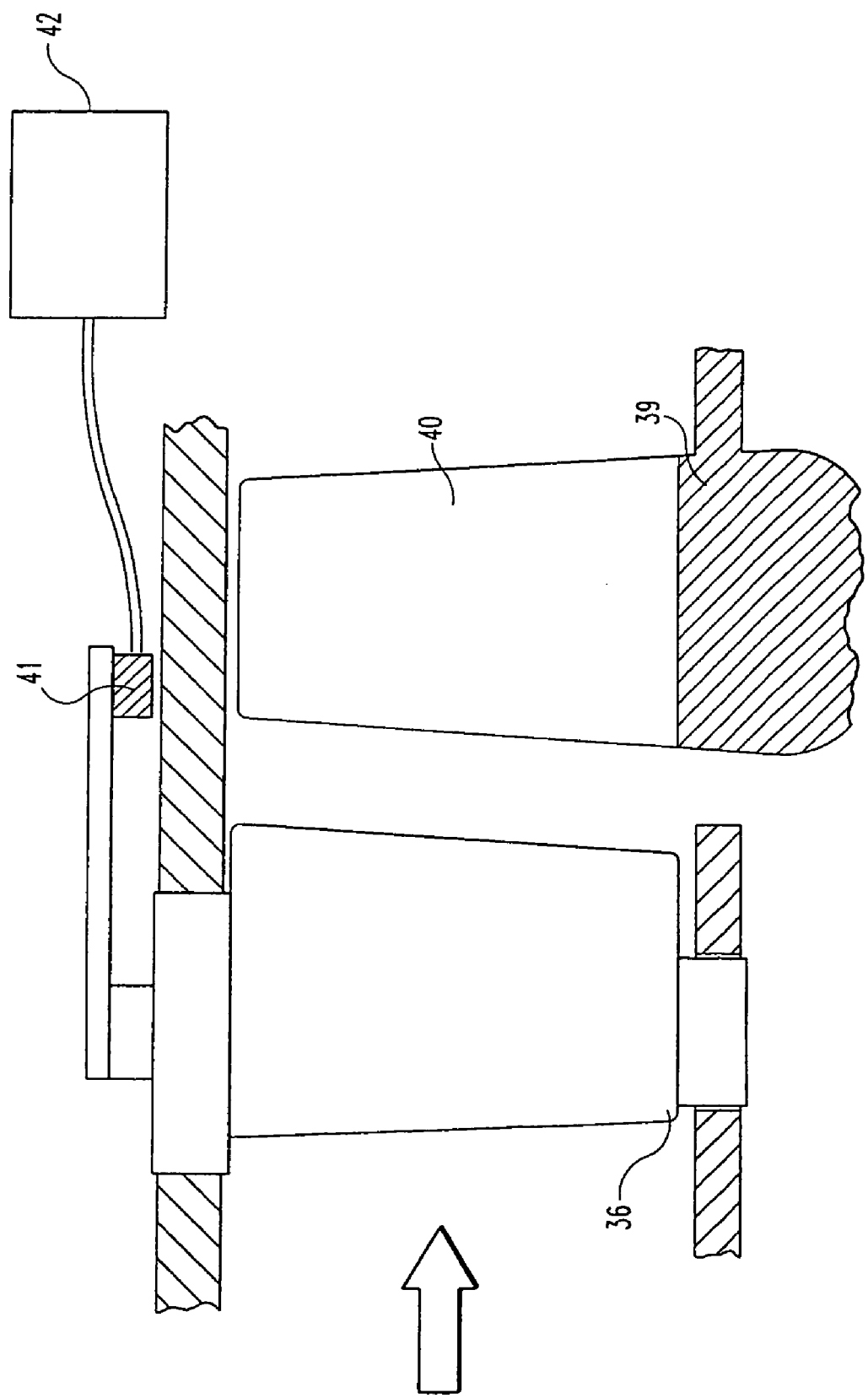
FIG. 3 is an illustrative view of a variable inlet guide vane (VIGV) comprising a portion of the gas turbine engine of FIG. 2.

With reference to FIG. 3, there is illustrated a portion of the low-pressure compressor 26 including a VIGV 36 disposed in the working fluid flow path prior to a rotor 39 including a plurality of blades 40. The VIGV 36 is just one of a plurality of the VIGVs 36 that are disposed around the fluid flow path. The rotor 39 and plurality of blades 40 rotate about an axis of the compressor and do work on the working fluid passing from the plurality of VIGVs 36. In one form the plurality of VIGVs 36 is evenly spaced around the annular flow path and are pivotable to adjust the angle of the VIGV relative to the fluid flow.

In one form the plurality of VIGVs 36 are coupled to a ring member 41 that allows the plurality of VIGVs 36 to move in unison. The actuator 42 is operatively coupled with the ring member 41. The actuator 42 is controlled by the engine control system and moves the ring member 41 the desired amount to effect a change in position of the plurality of VIGVs 36 relative to the fluid flow within the working fluid path. The actuator 42 may also include a position-sensing feature to allow feedback on the actual position of the VIGV 36. In an alternate embodiment a separate position sensor is utilized to provide an output signal indicative of the actual position of the VIGVs 36.

Figure 4:
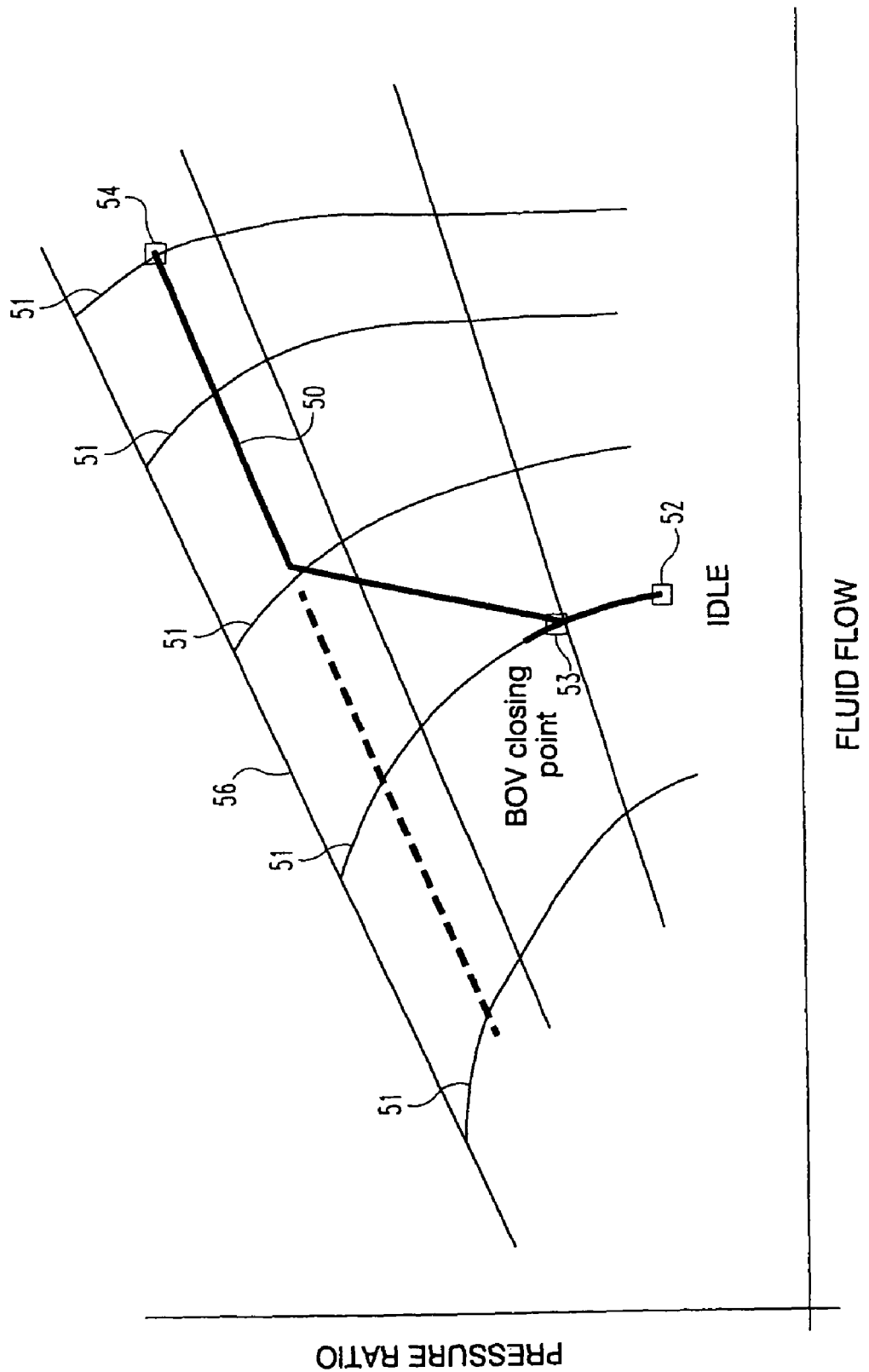
FIG. 4 is a schematic diagram illustrating characteristics of a low-pressure compressor being controlled by one embodiment of the present invention.

With reference to FIG. 4, there is illustrated the characteristics of the low-pressure compressor 26 of the present invention running at a constant rotational speed and connected with the power generation device 24. The low-pressure compressor working line 50 is maintained at a constant level and is independent of output power. The speed lines 51 have substantially the same value but each is represented at a different VIGV angle. From the idle point 52 to the BOV closing point 53 the working line is controlled by the modulation of the plurality of BOVs 35. In a preferred form the plurality of BOVs 35 are gradually closed during operation from the idle point 52 to the BOV closing point 53. Above the BOV closing point 53 to the base load point 54 the working line 50 is controlled and maintained by modulating the plurality of VIGVs 36 while the plurality of BOVs 35 are closed. In a preferred form of the present invention the plurality of VIGVs 36 are not actuated to control the working line 50 position until after the BOVs 35 are closed. At the BOV closing point 53 the plurality of VIGVs 36 are at a substantially closed position. In one form the substantially closed position corresponds to an angle of about 30°. However, other values for the closed position are contemplated herein.

The reader should compare the prior low-pressure compressor characteristics set forth in FIG. 1 with the low-pressure compressor characteristics of the present invention set forth in FIG. 4. In each of the two systems the low-pressure compressor is running at a constant speed and is connected to the external load; more specifically the power generation device 24. The description of controlling the working line herein will focus on the portion of the working line illustrated after the BOV closing point. The position of the working line 50 in the system of FIG. 4 is substantially above the position of the working line 13 in the system of FIG. 1 after the BOV closing point. The engagement portion of the working line 50 takes the working line from the level of the BOV closing point to a level significantly higher than the working line level 13 in the system in FIG. 1. The reader should appreciate that the low-pressure compressor 26 controlled by the present invention is operable at a constant working line level with higher pressure ratios and a corresponding increase in power output for the engine at a given combustor temperature. The working line 50 level in the present invention is independent of the output power of the engine.

The present invention maintains the working line 50 at a constant level over the life of the engine thereby allowing the available surge margin to be reduced. In one form of the present invention the available surge margin is the difference between the working line 50 and the surge line 56. In another form a pressure ratio limiter is provided between the working line 50 and the surge line 56. In this form the surge margin is the difference between the pressure ratio limiter line and the surge line 56. More specifically, in the present invention the threats associated with the working line of the low pressure compressor due to production scatter, deterioration or fouling are eliminated. Therefore, the threats remaining are due to the surge line level deterioration, transient excursions and instrumentation accuracy.

With reference to FIGS. 1 and 4, the reader can compare the relationship between the surge margins of the two systems. In the system of FIG. 1, the surge margin is represented by the difference between the surge line 12 and the pressure ratio limiter 11. In the system of FIG. 4, the surge margin is represented by the difference between the surge line 56 and the working line 50. The surge margin for the system of FIG. 4, is substantially less than the surge margin for the system of FIG. 1. The present invention results in a constant working line level throughout the life of the engine. Further, the system of FIG. 4 does not have the efficiency loss associated with the opening of the plurality of BOVs 35 between the BOV closing point 53 and the base load point 54.

In reviewing FIG. 4, the reader should note that each of the speed lines 51 is at substantially the same rotational speed. The degree of opening of the angle of the VIGVs 36 increases as one move to the right on FIG. 4. As the plurality of VIGVs are put in a more open position there is a resulting higher-pressure ratio and fluid flow rate. The present invention allows the low-pressure compressor working line level to be held constant throughout the engine life with increased pressure ratios and mass flow rates as compared to the prior systems such as set forth in FIG. 1.

Figure 5:
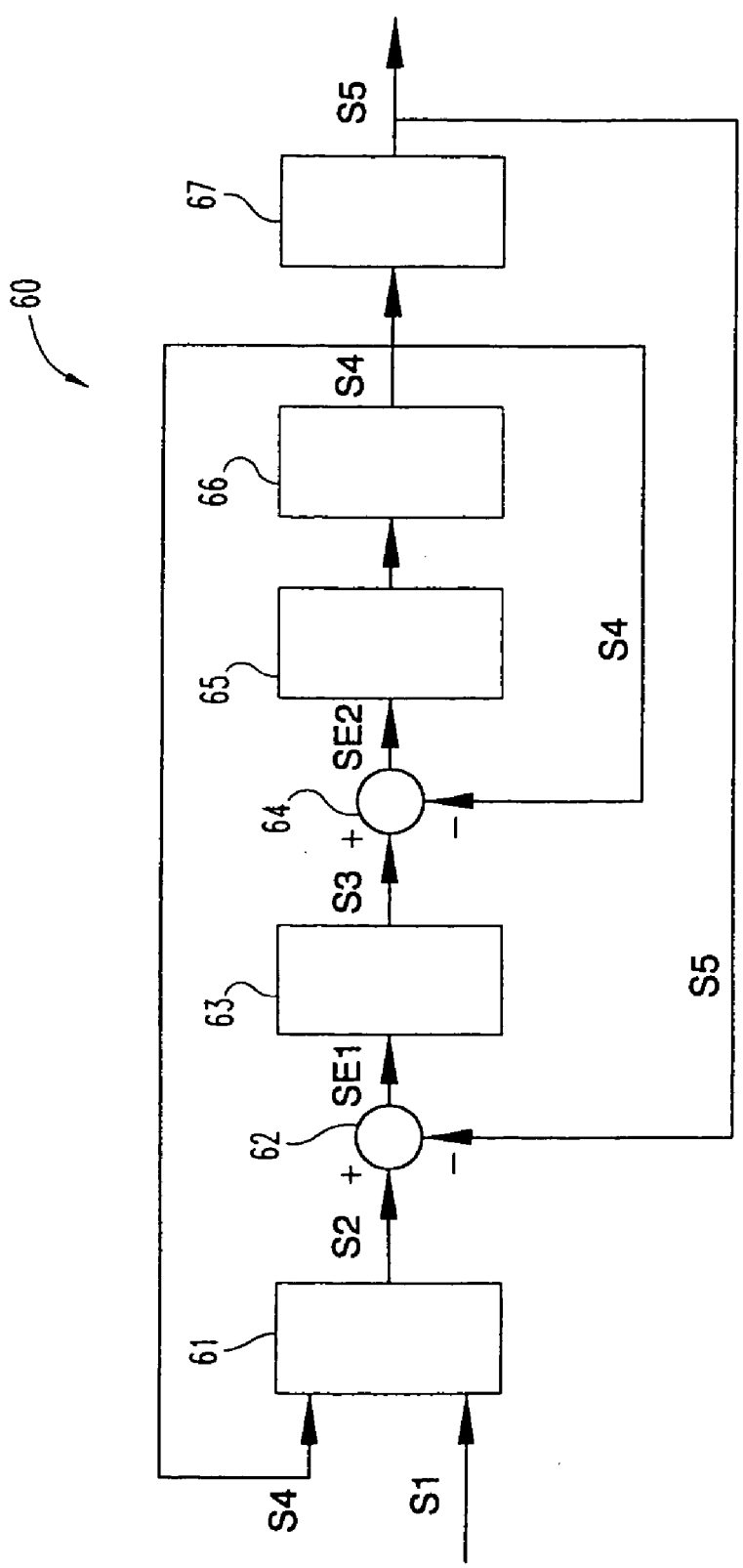
FIG. 5 is a block diagram of one embodiment of a system for closed loop control of the working line position within the low-pressure compressor.
Figure 6:
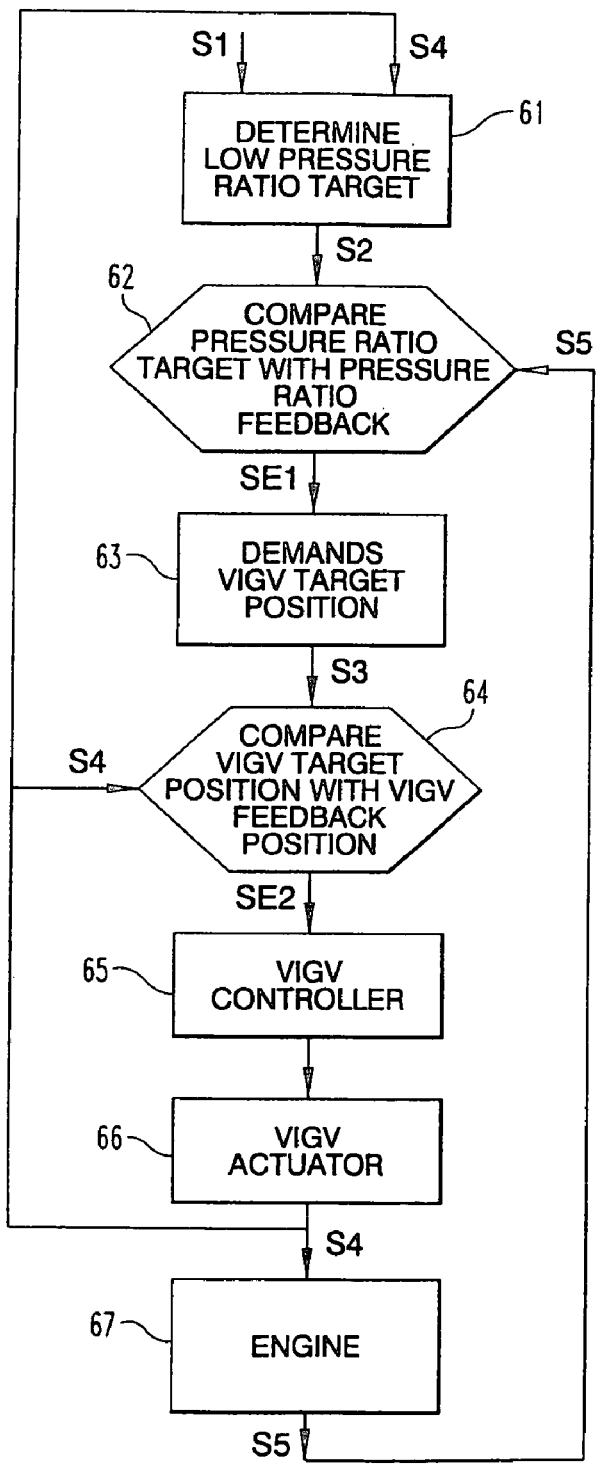
FIG. 6 is a flow diagram illustrating one embodiment for controlling the working line position within a low-pressure compressor.

With reference to FIGS. 5 and 6, there is schematically illustrated one system of the present invention for controlling the working line 50 of the low-pressure compressor. In one form the logic for controlling the system is located within a memory means in the controller 37 (FIG. 2), however other control architectures are contemplated herein. In a preferred form the logic to control the working line 50 of the low-pressure compressor is implemented through software running in one or a plurality of processors associated with the gas turbine engine 20.

At the BOV closing point 53 the control logic 60 for the low pressure VIGVs 36 begins in act 61. In one form act 61 utilizes a lookup-map/graph to determine the low pressure compressor ratio target based upon a corrected rotational speed of the compressor and the angle of the plurality of VIGVs 36. Signal S1 represents the low-pressure compressor corrected rotational speed. The initial value for the VIGVs 36 angle is that of the substantially closed position associated with the BOV closing point 53. The low-pressure compressor pressure ratio target is represented by an output signal S2. In act 62 the low-pressure compressor pressure ratio target represented by output signal S2 is compared with a measured pressure ratio feedback indicated by output signal S5 from the engine. In one form the act 62 is accomplished through a summer or adder function. More specifically, the measured pressure ratio feedback in output signal S5 is based upon the ratio of outlet static pressure determined downstream of the low pressure compressor 26 outlet and the total pressure at the inlet of the low pressure compressor 26. Referring to FIG. 2, the outlet static pressure is measured within duct 100 by sensor 18 and the total pressure at the inlet is measured by sensor 101. In one alternate form of the present invention the pressure ratio feedback is a synthesized value.

The output signal from 62 will be described as an error correction signal SE1. If the difference between the pressure ratio target and the pressure ratio feedback is below a threshold value the signal SE1 will indicate no change is necessary. However, if the difference between the pressure ratio target and the pressure ratio feedback is at or above a threshold value the signal SE1 will indicate that a change in the VIGVs angle is necessary. Signal SE1 is input into a low-pressure compressor pressure ratio controller 63. The low-pressure compressor ratio controller demands a VIGV target position represented by output signal S3.

Output signal S3 is compared in act 64 with the measured VIGV feedback position represented by output signal S4. In one form act 64 is accomplished through a summer or adder function. The output from the act 64 is represented by an error correction signal SE2 which is translated into the VIGV position feedback output signal S4 after being processed by the low pressure variable inlet guide vane controller 65 and the variable inlet guide vane actuator 66. In act 64 if the comparison between the VIGV target position and the VIGV feedback position is below a threshold value than the input for the VIGV position will not be altered. However, if the comparison between the VIGV target position and the VIGV feedback position are at or above a threshold value than the input for the VIGV position will be altered. Signal SE2 is input into the low pressure variable inlet guide vane controller 65 and the output from controller 65 provides the input to VIGV actuator 66. The VIGV actuator 66 causes the VIGVs to be rotated to the desired angle. Further, the VIGV actuator 66, determines the actual position of the VIGVs 36 and provides the feedback represented by output signal S4.

The output signal S4 is also utilized as an input to act 61. More specifically, the feedback position of the VIGVs 36 is utilized with the corrected rotational speed in determining the low-pressure compressor ratio target from the look-up map/graph.

As set forth above the preferred way to determine the pressure ratio feedback is through the measurement of the static pressure downstream of the low pressure compressor and the total pressure at the inlet to the low-pressure compressor. The pressure ratio feedback is then represented by (static pressure downstream of low-pressure compressor)/(total pressure at inlet of low-pressure compressor). However, the present invention contemplates alternative ways of determining the pressure ratio feedback value. In one alternative an algorithm is utilized to iteratively synthesize the pressure ratio feedback. A starting value for the pressure ratio P23/P22 (low-pressure compressor outlet pressure/low-pressure compressor inlet pressure) is selected. A low-pressure compressor efficiency map is used to calculate a temperature ratio T23/T22 (temperature at low-pressure compressor outlet/temperature at low-pressure compressor inlet). The method then calculates the intermediate-pressure compressor corrected speed (NI/RT24) based upon a measured rotational speed and where T24 equals T23. The intermediate-compressor corrected inlet flow (WRTP24) is calculated from the intermediate-pressure compressor working line map.

A map of ((pressure downstream of low-pressure compressor outlet)/(static pressure downstream of low-pressure compressor outlet)) vs. WRTP24 is used to calculate the pressure ratio of P24/P24S. The system includes measuring the static pressure downstream of the low-pressure compressor (P24S) within the engine. Thereafter, the pressure P24 is calculated from the known ratio of P24/P24S and the measured value for P24S. The pressure at the low-pressure compressor outlet (P23) is calculated from an inter-compressor duct pressure loss map of P23 (low-pressure compressor outlet) vs. P24 (pressure in the inter-compressor duct prior to the intermediate-compressor inlet). The system also measures the pressure at the low-pressure compressor inlet (P22). Thereafter, the pressure ratio of P23/P22 is calculated based upon the measured value of P22 and the calculated value for P23. The program is run in an iterative fashion until an error level for the value of P23/P22 is below a threshold value. The resulting value for P23/P22 is then utilized as the pressure ratio feedback signal S5 that is input into act 62.

As discussed above many aspects of the present application are directed to controlling the working line level of a compressor through a plurality of variable inlet guide vanes. The utilization of pressure ratios is described as a control parameter useful in carrying out the present invention. However, the present application further contemplates the utilization of other control parameters, such as corrected mass flow, to be used in a system for controlling the variable inlet guide vanes in order to maintain a constant working line for the compressor.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. An apparatus, comprising:
    an electric generator;
    a first compressor including a plurality of variable inlet guide vanes;
    a first turbine coupled to said first compressor and said electrical generator, said first turbine driving said first compressor and said electrical generator at a substantially constant speed;
    a second compressor;
    a second turbine coupled to said second compressor and operable to drive said second compressor; and
    said first compressor has a working line maintained at a constant level by closed loop control of said plurality of variable inlet guide vanes.

2. The apparatus of claim 1, wherein the control of said plurality of variable inlet guide vanes is independent of output power.

3. The apparatus of claim 1, wherein said first compressor is a low-pressure compressor;
    wherein said first turbine is a low-pressure turbine;
    wherein said second compressor is a higher pressure compressor than said low-pressure compressor;
    wherein said second turbine is a higher pressure turbine than said low pressure turbine;
    wherein said plurality of variable inlet guide vanes are joined by a ring; and
    which further includes an actuator coupled with said ring and operable to move all of said plurality of variable inlet guide vanes in unison.

4. The apparatus of claim 1, which further includes a plurality of bleed off valves in fluid communication with said first compressor, said plurality of bleed valves being operable to control the working line level up to a bleed off valve closing point; and
    wherein said first compressor working line is maintained at a constant level by said plurality of variable inlet guide vanes after said plurality of bleed off valves are closed.

5. The apparatus of claim 1 wherein said first compressor is an axial flow compressor including an inlet and an outlet;

which further includes a first sensor at said inlet operable to determine total pressure and a second sensor aft of said outlet to determine a static pressure downstream of said outlet; and wherein a ratio of said static pressure to said total pressure is utilized in the closed loop control of said plurality of variable inlet guide vanes.

6. The apparatus of claim 1, wherein said working line level is maintained at a constant level over the life of the engine.

7. The apparatus of claim 1, which further includes means for controlling the maintenance of said working line at a constant level.

8. The apparatus of claim 1, wherein the control of said plurality of variable inlet guide vanes is independent of output power;

wherein said first compressor is an axial flow low-pressure compressor;

wherein said first turbine is a low-pressure turbine;

wherein said second compressor is an axial flow higher pressure compressor than said low-pressure compressor;

wherein said second turbine is a higher pressure turbine than said low pressure turbine;

wherein said plurality of variable inlet guide vanes are joined by a ring;

which further includes an actuator coupled with said ring and operable to move all of said plurality of variable inlet guide vanes in unison;

which further includes a plurality of bleed off values in fluid communication with said low-pressure compressor, said plurality of bleed valves being operable to control the working line level up to a bleed off valve closing point;

wherein said low-pressure compressor working line is maintained at a constant level by said plurality of variable inlet guide vanes after said plurality of bleed off valves are closed;

wherein said low-pressure compressor including an inlet and an outlet; which further includes a first sensor at said inlet of the low-pressure compressor and being operable to determine a total pressure and a second sensor aft of said outlet of the low-pressure compressor and being operable to determine a static pressure downstream of said outlet; and wherein a ratio of said static pressure to said total pressure is utilized in the closed loop control of said plurality of variable inlet guide vanes.

9. An apparatus, comprising:

an electric generator;

a low-pressure compressor including a plurality of variable inlet guide vanes and a plurality of bleed off valves; a high-pressure compressor;

a high-pressure turbine coupled to said high-pressure compressor and operable to drive said high-pressure compressor;

a low-pressure turbine coupled to said low-pressure compressor and said electrical generator, said low-pressure turbine driving said low-pressure compressor and said electrical generator at a constant rotational speed; and said low-pressure compressor has a working line controlled by operation of said plurality of bleed off valves up to a bleed off valve closing point, at said bleed off valve closing point said plurality of bleed off valves are closed, and control of said working line above said bleed off valve closing point is through the operation of said plurality of variable inlet guide vanes to maintain said working line at a constant level independent of engine output power.

10. The apparatus of claim 9, wherein said plurality of variable inlet guide vanes are joined by a connecting member;

which further includes an actuator coupled with said connecting member and being operable to move all of said plurality of variable inlet guide vanes in unison; and wherein the control of the plurality of variable inlet guide vanes is in closed loop.

11. The apparatus of claim 9, wherein said low-pressure compressor is an axial flow compressor including an inlet and an outlet;

which further includes a first sensor at said inlet operable to determine a total pressure and a second sensor aft of said outlet to determine a static pressure downstream of said outlet; and wherein a feedback pressure ratio of said static pressure to said total pressure is utilized in the control of said plurality of variable inlet guide vanes.

12. The apparatus of claim 9, wherein said working line is maintained at a constant level over the life of the engine.

13. The apparatus of claim 9, which further includes control means for controlling the maintenance of said working line at a constant level.

14. The apparatus of claim 9, wherein the control of said plurality of variable inlet guide vanes is independent of output power;

wherein said plurality of variable inlet guide vanes are joined by a connecting member;

which further includes an actuator coupled with said connecting member and being operable to move all of said plurality of variable inlet guide vanes in unison;

wherein said low-pressure compressor is an axial flow compressor including an inlet and an outlet;

which further includes a first sensor at said inlet operable to determine total pressure and a second sensor aft of said outlet to determine a static pressure downstream of said outlet;

wherein a feedback pressure ratio of said static pressure to said total pressure is utilized in the control of said plurality of variable inlet guide vanes;

wherein the control of the plurality of variable inlet guide vanes is in closed loop; and wherein said working line is maintained at a constant level over the life of the engine.

15. An apparatus, comprising:

an electric generator; and a multi-spool gas turbine engine comprising:

a first compressor having a working line level;

a first turbine coupled to said first compressor and said electrical generator, said first turbine driving said first compressor and said electrical generator at a substantially constant speed;

a second compressor;

a second turbine coupled to said second compressor and operable to drive said second compressor; and means for maintaining said working line of said first compressor at a constant level.

* * * * *